US 9,025,907 B2

(12) United States Patent
Bogart et al.

(10) Patent No.: US 9,025,907 B2
(45) Date of Patent: May 5, 2015

(54) KNOWN GOOD LAYOUT

(71) Applicant: Intellectual Ventures Fund 83 LLC, Las Vegas, NV (US)

(72) Inventors: William Jay Bogart, Williamson, NY (US); Michael James Barry, Rochester, NY (US); Joseph Leo Vonasek, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 119 days.

(21) Appl. No.: 13/827,281

(22) Filed: Mar. 14, 2013

(65) Prior Publication Data

US 2013/0294709 A1    Nov. 7, 2013

Related U.S. Application Data

(60) Provisional application No. 61/618,190, filed on Mar. 30, 2012.

(51) Int. Cl.
| | |
|---|---|
| *G06K 9/36* | (2006.01) |
| *G06T 7/00* | (2006.01) |
| *G06Q 30/06* | (2012.01) |
| *G06T 11/60* | (2006.01) |

(52) U.S. Cl.
CPC ............... *G06T 7/0022* (2013.01); *G06T 7/00* (2013.01); *G06Q 30/06* (2013.01); *G06T 11/60* (2013.01)

(58) Field of Classification Search
USPC ............ 382/284, 294, 305; 345/672; 358/1.2, 358/450, 540; 715/210, 730, 732, 769, 838
See application file for complete search history.

(56) References Cited

U.S. PATENT DOCUMENTS

| 7,620,267 | B2 * | 11/2009 | Widdowson | 382/284 |
| 7,689,064 | B2 * | 3/2010 | Miksovsky et al. | 382/294 |
| 7,848,596 | B2 * | 12/2010 | Widdowson | 382/294 |
| 8,504,932 | B2 * | 8/2013 | Quek et al. | 715/769 |
| 8,774,528 | B2 * | 7/2014 | Hibino et al. | 382/218 |

* cited by examiner

*Primary Examiner* — Ahn Do (57) ABSTRACT

A computer implemented method of generating a digital collage layout for a group of digital images is disclosed. A group of digital images is retrieved from a computer accessible memory. A determination is made whether to select the digital collage layout from a stored collection of digital collage layouts or to generate a new set of digital collage layouts and select the digital collage layout from the new set. Based on determination, the digital collage layout is provided from the stored collection or from the new set.

11 Claims, 10 Drawing Sheets

KNOWN GOOD LAYOUT

CROSS-REFERENCE TO RELATED PATENT APPLICATIONS

This application claims priority from U.S. Provisional Application 61/618,190, filed Mar. 30, 2012, incorporated herein by reference in its entirety.

FIELD

The present invention pertains to image layout algorithms. In particular, these layout algorithms are designed to assist consumers to arrange collages and photobooks in a pleasing manner for printing images.

BACKGROUND

Various printed photo products such as collages often comprise a plurality of images arranged in a pleasing order on the printed output. Photo auto layout solutions, either dynamic layout or predefined layout, often fall short of rendering a pleasing looking product. Often, dynamic and predefined layout algorithms do not arrange the images within the layout in an artistic or pleasing fashion.

Dynamic layout algorithms implemented on desktop computers rarely apply the right steps to produce a layout that enables images to fit together, much like a puzzle, whereby the layout looks pleasing. They typically employ algorithms similar to printed circuit board automatic layout algorithms, and additional layout techniques like image size normalizing, to attain a layout where the images are spread out on a page as evenly as possible. For example, distances between images, and between images and layout borders, are selected to be similar for an even distribution of images in an image space. This often produces a bland looking layout which doesn't take into account the aspect ratio of the image or the resolution of the image. This solution is also often not deterministic but random, thus requiring the customer to request from the computer system a new layout over and over until eventually a pleasing enough layout is generated.

Predefined layout algorithms often do not include enough predefined layouts to cover all the orientation and aspect ratio combinations of images that can be selected by a customer. The resulting layout contains images with differing aspect ratios than the predefined openings provide.

One of the strengths of a template based collage or photobook page layout system is that it can utilize artistically designed layouts which results in very pleasing layouts. An additional goal in creating a pleasing layout is to use all of the image content, i.e. no zooming or cropping.

Template based layout systems have inherent deficiencies. One of the crucial deficiencies is that a very large number of templates are required to handle all the orientation combinations of images with differing aspect ratios, e.g. 4×3, 3×2, 15 7×5, and 16×9 are just a few of the aspect ratios that cameras produce. Customers' images can be cropped without maintaining the original aspect ratio, which compounds the problem even more.

For example, if we were to provide templates for an 8 image collage, we would need enough templates to cover all combinations of landscape versus portrait images. We would need 1 template with 8 landscape openings, 1 template with 8 portrait openings, and another 7 templates covering the 7 different combinations of landscape versus portrait openings. This would require a minimum of 9 templates. This simplistic example only works when all 8 images have the same aspect ratio. When we combine images with different aspect ratios this solution falls short.

If we were to create enough layouts to handle all combinations of landscape versus portrait 4×3 aspect ratio images, and we wanted to ensure we could also provide enough templates for layouts having from 1 to 8 images on a layout, it would require no less than 43 templates. We would need another 43 templates to provide for a different image aspect ratio size.

The real problem exists when images with differing aspect ratios are mixed together on the same layout. The number of additional layouts to cover all of 5 the mixed combinations of images with different aspect ratios in the same layout increases exponentially. A new algorithm is needed to extract the designer's original layout intent within a template and then re-layout the mixed aspect ratio images using the intent of the original layout.

SUMMARY

Preferred embodiments include both dynamic layout and predefined layout technologies in such a way that the end result benefits from the strengths of both. Predefined layout algorithms are powerful in that they can serve up the most appropriate layout very efficiently, almost instantly because of the low amount of processing required to perform the task. Dynamic layouts are often slow to produce a good layout and get invoked over and over by a customer until they produce a pleasing layout. The embodiments marry the two technologies together in such a way that they complement each other's strengths and, when combined, includes a method to allow a computer system to learn from user/customers preferences for a pleasing layout over time.

A preferred embodiment includes a dynamic layout algorithm that feeds pleasing layouts back into the predefined layout system so that the dynamic layouts can be turned into predefined layouts by being saved or stored for future use through the more efficient predefined layout mechanism. This is an adaptive learning mechanism. A computer system implemented kiosk system can learn from customers what constitutes a pleasing layout, thus enabling the kiosk to serve up pleasing layouts better and faster over time as well as give the customer more options at selecting, or browsing a larger selection of pleasing layouts.

Further preferred embodiments include different distinguishable technologies. The first is a predefined layout selection algorithm referred to as NGLU (Known Good Layout Universe) that intelligently populates customer images into openings within a vast collection of known good predefined layout candidates. After populating the images into the openings of layouts within the collection of known good layout candidates, the candidate layouts are scored in order to rate their aesthetics. Once all of the candidate layouts within the collection are scored, the collection of candidate layouts are sorted in descending order based on their aesthetic rating so that the highest scoring layout can be served up to the customer before lower scoring layouts. This system is highly deterministic and produces a best fit layout every time.

The second technology is referred to as HPLM (Hybrid Page Layout Manager) which manages both an existing dynamic layout engine ("DLE") and the NGLU algorithm. The HPLM's responsibility, upon customer selection of a plurality of images (number of images=N), is to determine which of the two layout algorithms should be used: the DLE algorithm or the predefined NGLU layout algorithm. HPLM does this by querying NGLU of its support of layouts with N number of openings. If NGLU supports predefined layouts with N number of openings then HPLM selects NGLU as the algorithm to use as the layout device for N number of images. If NGLU does not support layout with N number of openings then the dynamic layout algorithm is used for creating layouts with N number of openings that use the N number of customer selected images.

DETAILED DESCRIPTION

This section provides terms and their definitions that are used within the present patent application.

NGLU—Known Good Layout Universe includes a collection of known good layout templates containing regions for images to be placed. These layouts can be used to define collages and photobook pages for output. It can also be used for digital signage, digital frames and digital photobooks.

NGLU Canvas—an area defined by a width and height that contains NGLU regions laid out in a pleasing pattern. The canvas's width and height are typically the dimensions of a collage or a photo book page.

NGLU Layout algorithm—a method of automatically selecting the best layout, for any given selection of images, from a collection of template based layouts. The method also includes placing each image into the proper region by using image placement criteria.

NGLU region—a designated area where an image can reside. Regions typically have a standard aspect ratio i.e. 4×3, 16×9, panoramic, etc. They can be portrait or landscape.

SCORE—Images are ranked by the algorithm as it tries to put each image into each region and compares its aspect ratio, and resolution with the regions aspect ratio and resolution (DPI).

Aspect ratio score result is a range from 0 to 100.
Resolution score is a 10 when image resolution is higher than the region and 0 when its resolution is less than the region.
Image area score is an additional value added to the score if the image aspect ratio is similar to the regions aspect ratio. The result is the image's width*height as it is placed in the region. (Units are in inches)

NGLU template file—XML file that contains a canvas, image region definitions and text node regions.

One objective of NGLU Selection and fitting algorithm is to find the (most appropriate) region for each image. It must perform image—region attribute comparison and do it very quickly. Performance is important.

Figure 9:
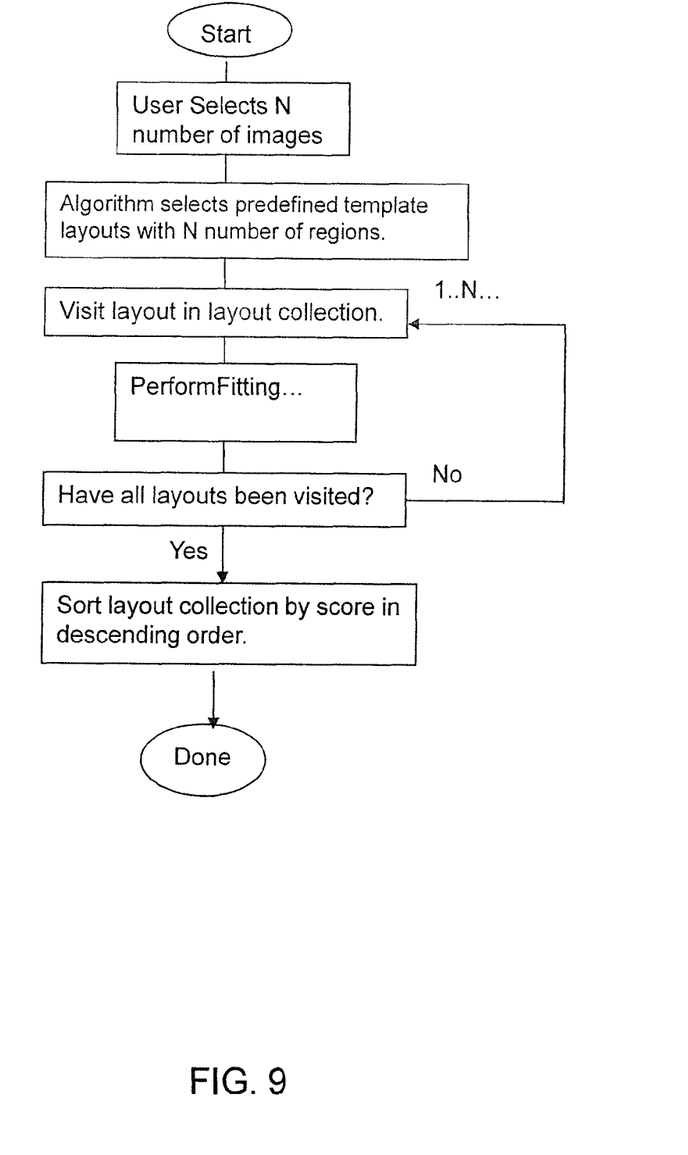
FIGS. 9-10 illustrate example algorithms for implementing embodiments of the present invention.
Figure 10:
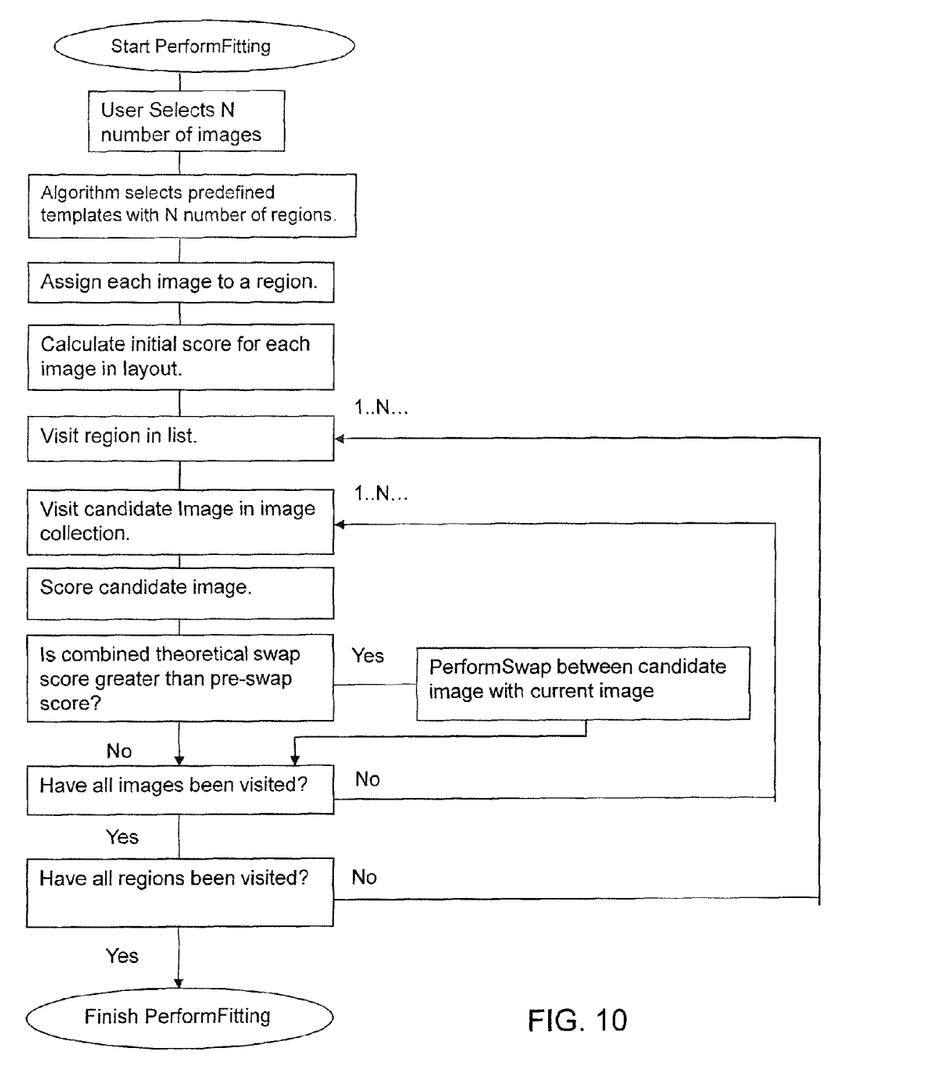

FIGS. 9-10 show two algorithms for NGLU and are described below. The algorithm iterates through the collection of regions from each layout within the collection of layouts and scores each image in each region and finds the best region for each image. It continues this iteration through the collection of layouts until all layouts within the collection have the same set of images placed within all of their regions.

The collection of layouts are scored and sorted by score and served up to the client for viewing. The customer initially views the highest ranking layout.

One main objective of NGLU is to not crop images when placing them into regions. This is a design requirement as cropping often leads to poor results from 20 most consumers' perspectives. Each image has attributes stored in association with it that describes it to some extent. Example stored attributes are aspect ratio and image resolution.

Each image region within a template has an aspect ratio and size that describes what type of image that would be most appropriate for that particular region. The Algorithm scores images based on the image's resolution and aspect ratio and how it compares to a particular region. An image with equivalent aspect ratio will also have an additional image area score added to its overall score for that image region comparison.

Initially the algorithm analyzes the images and determines what its aspect ratio (dimensions) and resolution are. The algorithm creates an initial mapping of images to regions and computes a fitness score for each image based on the region that it is initially assigned to. An overall sum total score for the entire template mapping is computed and is the baseline starting point before the algorithm iterates through the list of regions.

The algorithm updates the overall sum total score after each iteration through the list of regions and runs until the highest overall sum total score is achieved. It continuously iterates through the list of regions comparing candidate 10 image's attributes with the region's attributes and computing a new candidate image score. When the candidate image's new fitness score is higher than the regions' currently assigned image's score, the algorithm enters into a potential swap condition.

Once the potential swap condition occurs, the region's existing image is scored against the candidate image's assigned region and if the new combined score is higher than the old combined score then the swap occurs. The idea is to only swap if the combined score for the two images is higher than the non swap score, increasing the templates overall score.

The initial state of the algorithm will contain a list of regions H and a list of images I. There will be an initial mapping of images to regions where $I_I$ maps to $H_I$, In maps to $H_n$. This initial mapping will also produce an initial fitness measurement score as a starting point for the algorithm. Each image to region mapping will be scored based on attributes computing/matching. The initial total score computed on the entire mapping will be our initial best solution. The NGLU algorithm will run for a computed number of iterations (number of images×number of regions).

For each region:
The NGLU algorithm performs an imaginary swap of the existing image $I_i$ with a every image $I_r$ in the list of images and computes a fitness measurement score based on the attributes the image $I_r$ satisfies and determine if the $I_r$ image is a better fit with region $H_i$.
If $I_r$ to $H_i$ is a better fit then it compares both images ($I_i$ and $I_r$) scores with their new possible swapped regions ($H_i$ and $H_r$) to determine if the fitness measurement score is an overall better fit. If the average fitness measurement score is better, then the swap occurs.

After the process is applied to each region in the list, a total score for all image to region mappings will be computed by summing the entire list of image scores and compared with the previous total score. This sum total score is given to the template layout. This process occurs for each layout in the collection. A single run of the algorithm iterating over each region will produce a better solution candidate than the last.

The NGLU Selection and fitting algorithm performs several tasks in order:

- Based on a user's selection (quantity) of images it selects a collection of predefined layouts that that have an equal number of image regions in each layout. i.e. 4 images (1 landscape and 3 portraits) will cause the algorithm to pull up all layouts with 4 regions.
- NGLU places all of the selected set of images into image regions in each of the NGLU layouts by using a scoring method which uses the images resolution and aspect ratio attributes to determine which region each image should go in.
- Once all images have been placed into the collection of selected layouts, the layouts are scored/ranked and sorted by score/rank in descending order.
- The NGLU Layouts are then served up to the client starting with the highest scoring NGLU layout.
- NGLU provides the client app the capability to index through the sorted layouts forwards and backwards allowing the user/customer to select which layout they prefer.

Dynamic randomly created layouts that are generated by the present software are purchased by customers. Those layouts can be saved to the hard drive (kiosk) as a template layout for later non-dynamic use by future customers. We can analyze these layouts for characteristics that can aid in determining what a customer constitutes as a good layout.

These attributes are:

Determine average amount of white space area that exists in the Collages or

Photobook pages layout area that are purchased by Customers.

- This information can be used to determine an overall customer preference of white space area versus image area, i.e. white space area/total image area of purchased layout. This number can be compared with dynamically created KPK layouts so that KPK can favor layouts that have the similar ratio value that is based on customers purchase preferences. This could be per customer, if they are an identified 15 customer (such as facebook customer). This type of layout favoring could be applied on a per kiosk basis, or geographically or globally.

Determine the average number of images used on a Photobook page layout.

- This information can be used to determine an overall preference whether customers prefer more or less images on a collage or photobook page layout. When the software creates Photobooks it can use this information to determine how many pages to create based on the number of images selected for the photobook and the customers preference number of images per page. i.e. (# of pages=# of customer images selected/preference # images per page) This could be per customer if they are an Identified customer (facebook customer). This reference could be applied on a per kiosk basis, or geographically or globally.

Determine the average amount of margin on the Collage or Photobook layout.

- This information can be used to determine an optimum amount of margin based on what customers prefer on a collage or photobook page layout. When the software creates Photobooks it can use this information to determine how much to scale the layout to effectively attain the preferred margin size. This could be per customer if they are an Identified customer, (facebook customer). This preference could be applied on a per kiosk basis, or geographically or globally.

Determine which layouts are most popular by keeping track of which ones are used for customer purchased collages and photobooks.

- This information can be used to effect the scoring mechanism when ordering the many candidate layouts for a collage or photobook page. When multiple layouts get created for a single collage or a single Photobook page, instead of just using layout properties like layout
- aspect ratio score or anti-thumbnail score to score the layout, the popularity of the layout can be factored into the overall layout score. This can enable the layout ordering mechanism to present the more popular layouts while still taking into account the normal layout attributes. This preference could be applied on a per kiosk basis, or geographically or globally.

Background image selection for a collage or photobook page, did customer select one of their own images as the background, or did they select a pre-canned kiosk themed background.

- This information can be used to determine if the kiosk should automatically select one of the customer's images for the background or suggest using a pre-canned kiosk provided themed background. The software would determine this by collecting how many purchased layouts use customer images versus pre-canned kiosk content. This could be per customer if they are an identified customer, (e.g. facebook customer). This preference could be applied on a per kiosk basis, or geographically or globally.

Did customer use a canned pre-provided themed kiosk background and which ones were used.

- This information can be used to reorder the preprovided themed backgrounds based on customer popularity. When a customer chooses a background theme, the kiosk can order the themed backgrounds by popularity such that customers get to see the most popular first. This could be per customer if they are an identified customer, (facebook customer). This preference could be applied on a per kiosk basis, or geographically or globally.

Determine which pre-provided themed kiosk background was selected for the purchased collage or Photobook pages.

- This information can be used to determine which pre-provided themed backgrounds customers like. This can be used in negotiating the acquisition of background themes from artists based on which themes sell best. By employing machine learning to weed out least customer selected themes, the kiosk can use this data to create a business model where only customer purchased backgrounds are licensed from artists.
- This could be used for cost savings. This preference could be applied geographically or globally.

Greeting cards use custom backgrounds and textual predefined textual content that are purchased from artists. Determine which cards are more popular based on customer purchase data.

- Use this data to reorder which cards. This could be used to show the post popular first or it could be used to use sales promotionals to sell the less popular ones. This could be applied on a per kiosk basis, or geographically or globally.

Determine the layout's text font type (i.e. Times Roman, Arial, etc . . . ) and accumulate data to determine which fonts are more popular.

This information can be used to order the fonts based on popularity. The kiosk can display the most popular fonts first. This preference could be applied on a per kiosk basis, or geographically or globally.

Determine which upsells are more successful than others and use this information to A) display more popular upsells, B) use the information to enhance least successful upsells.

Customers are going to being allowed to edit and create photobook layouts by moving and changing the sizes of images in the layout. Customers are going to be able to add clip art to any locations in the layout. Customers are also going to be able to add caption text and journal text within the layout.

These customer edited/created layouts can be saved to the kiosk hard drive and online servers as template based layouts. This enables our current layout system to reuse these customer edited/created layouts (saved) by serving these up to new customers. This approach can allow customer created layouts to become kiosk layouts that can be offered to other customers.

Accent color (Auto collage, and photobook page background color Selection) automatically creates colorized backgrounds dynamically. The algorithm for selecting the optimal background color uses colors extracted from within the group of images for the layout. It selects the most common color but also uses weightings based on ROB color sum value to select the best color. The kiosk will also present to the customer the other remaining candidate background colors that can also be used as the background color. Store or save the customer's (manually) selected color along with all candidate colors for that layout.

Run an analysis algorithm to determine customers preferences:
The first goal for this algorithm is to determine if customers prefer darker versus lighter colors.
Determine the average color from all the candidate colors found in the images (within a layout). Determine if the customer's manually selected color out of the candidate colors is darker or lighter than the average candidate color.
Keep a running tally of manually selected Darker versus Lighter color.
Use this information to re-weight the auto color selector algorithm to conform more to the customer's preference.
The second goal is to determine if there are more popular colors over other colors.
This would require keeping a tally of virtual color buckets and dropping the customers manually selected colors into the color buckets.
This information could be used to re-weight certain colors over other colors so that the auto color selector algorithm will choose those more preferred colors over the less preferred colors in the auto color selector algorithm so that it favors the more popular colors based on the customers preferences when it automatically selects the background color.

We could, in general, use geographical information to apply geographical preferences to regions.

Figure 1A:
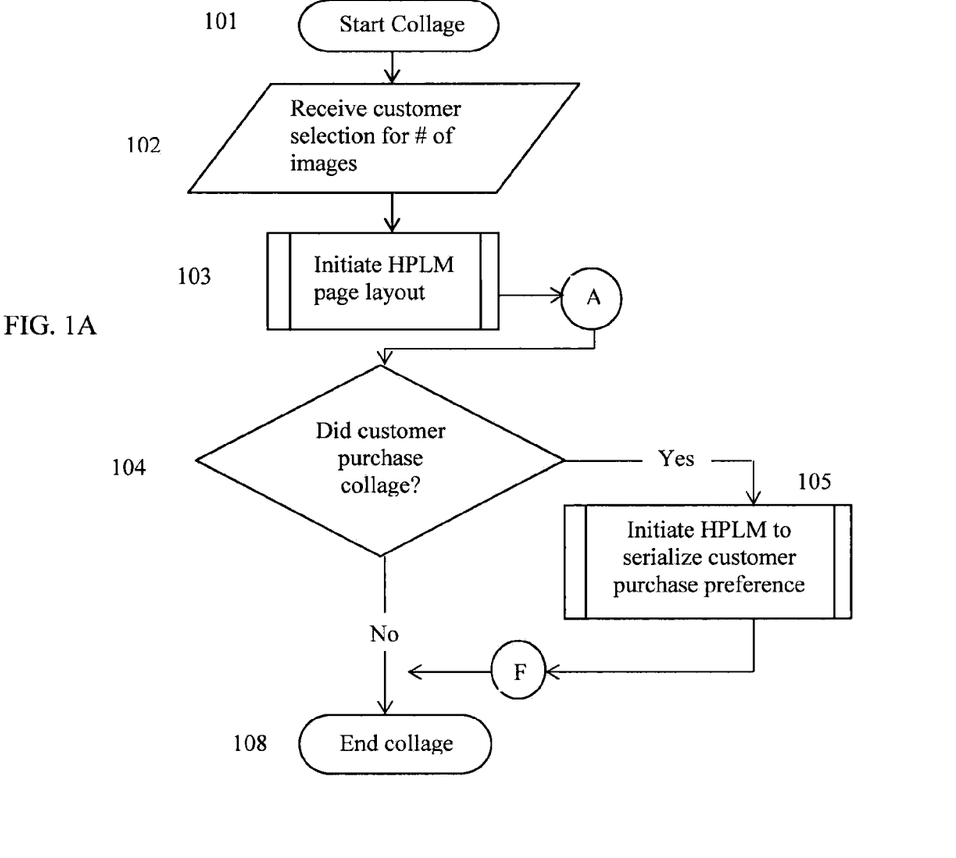
FIGS. 1A-B illustrate an HPLM algorithm.

The following is a detailed description of how preferred embodiments perform the layout process and store/serialize customer purchased layout information. With reference to FIG. 1A, the collage application installed on a computer system is initiated at step 101. At step 102, the user selects N number of images via a GUI provided by the application. After the user selects images, HPLM starts the page layout at step 103 in the collage creation process (same as step 203 in FIG. 2) by receiving the N number of images selected by the user at step 204. HPLM then requests NGLU to reply whether it supports N number of region layouts at step 205. If NGLU returns false then at step 208 HPLM initiates DLE to produce a layout with N number of regions (same as step 508 in FIG. 5).

Figure 2:
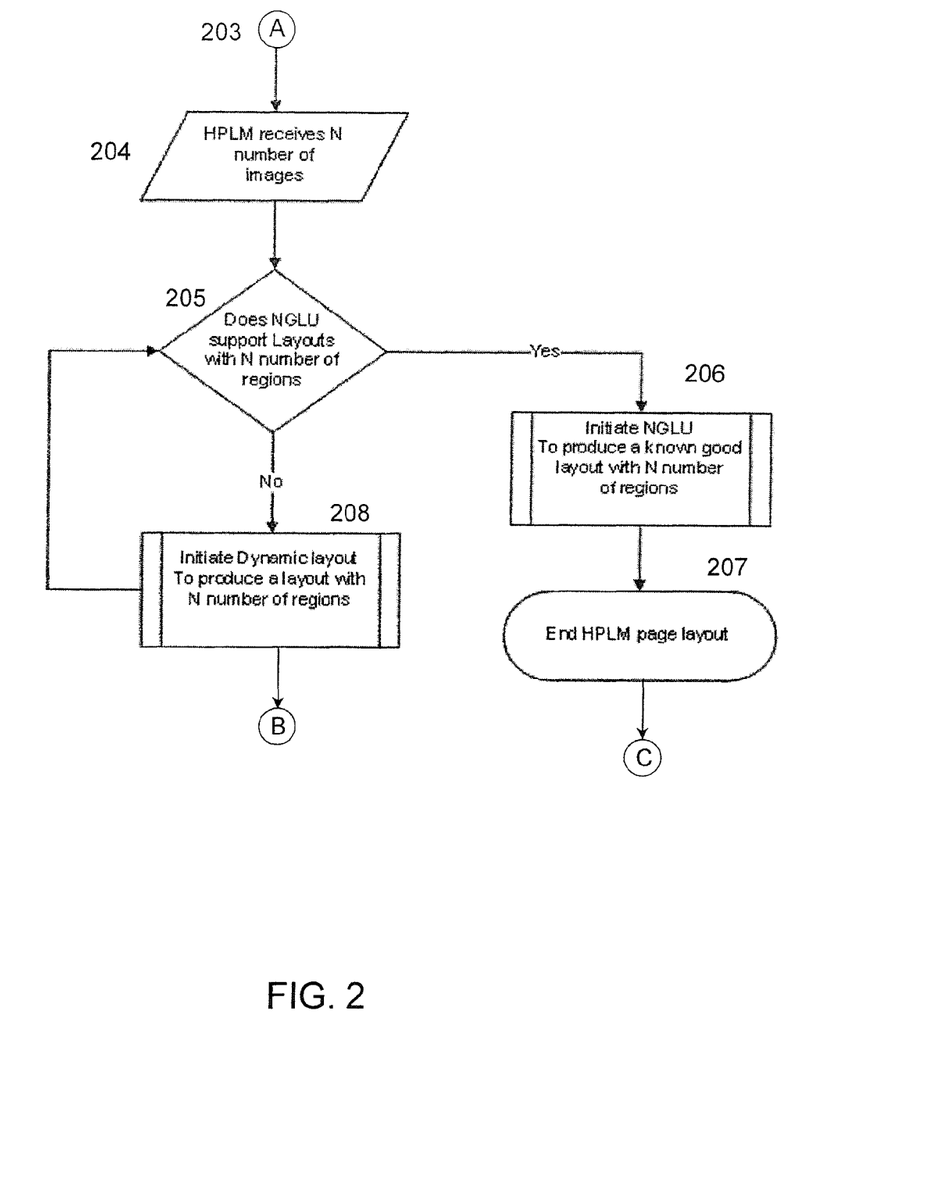
FIG. 2 illustrates another HPLM algorithm.
Figure 5:
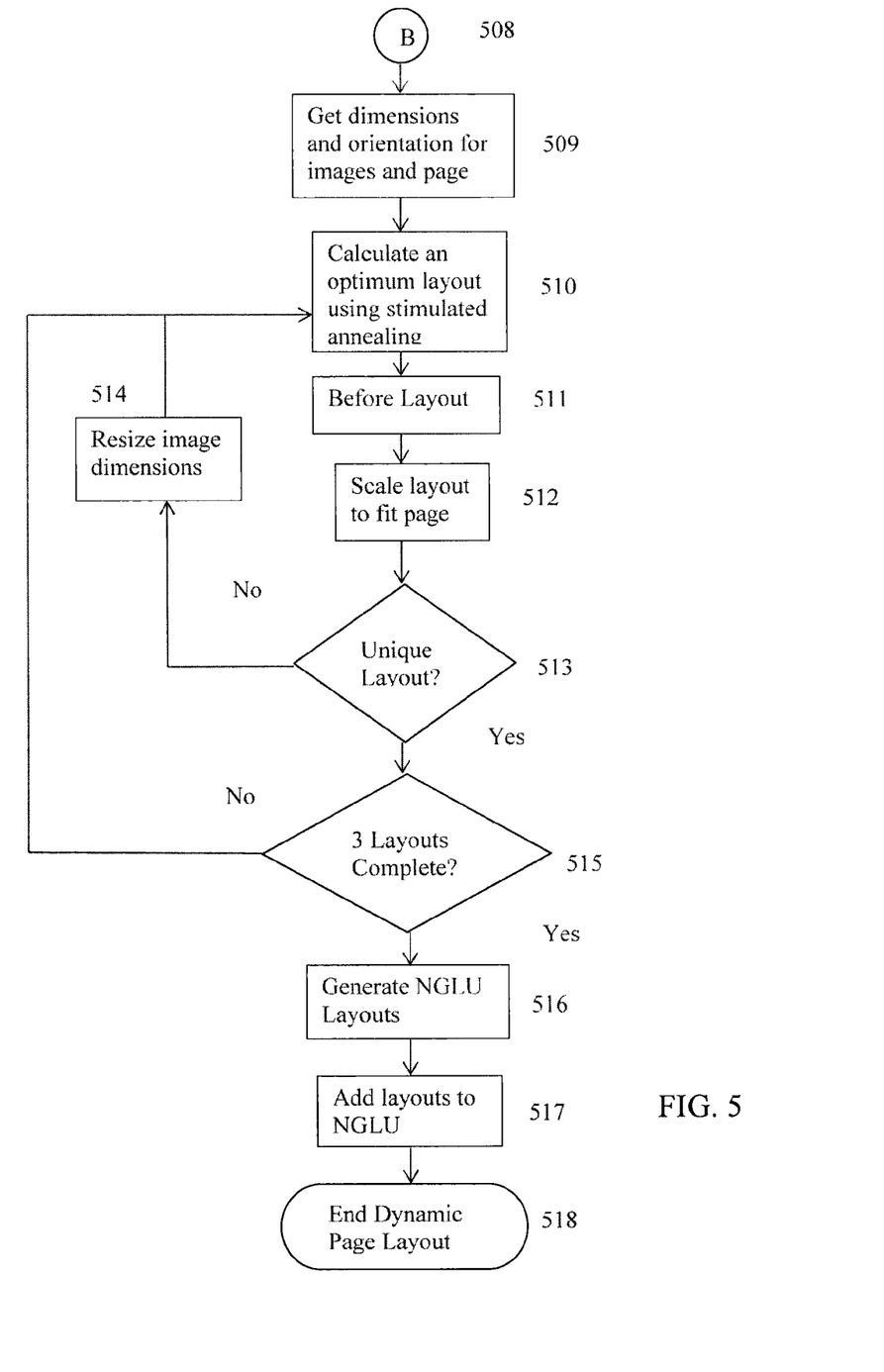
FIG. 5 illustrates a dynamic layout algorithm.

At step 509 DLE obtains dimensions and orientation for the N images and pages. At step 510 DLE starts the task of creating three unique dynamic layouts by calculating layouts using simulated annealing. At step 511 DLE balances the layout, calculated at step 510, at step 511 and then scales it to fit the page at step 512. DLE determines if layout is unique compared to the one or two other ones of the three dynamic layouts. If this step is performed for the first time in the loop then the algorithm identifies the first layout as unique. If the layout is determined at step 513 as not unique, then the layout is discarded and, at step 514, the images are resized and sent back to step 510. If the layout is unique at step 513, DLE determines if three layouts have been created at step 515. If there are not three then the process of creating a new dynamic layout is repeated at step 510. Once the three layouts have been created, HPLM converts the DLE layouts to NGLU layouts at step 516 and adds them to the NGLU component (database) at step 517 for later use. HPLM then verifies that the new recently created DLE layouts exist and are available in NGLU. HPLM then initiates NGLU to produce a known good layout with N number of regions at step 206. At step 207 the HPLM procedure ends. Steps 206 and 207 need not occur in the sequence shown and can be interchanged. NGLU is able to use the newly created layouts from DLE to populate layouts with the N number of images.

Figure 3:
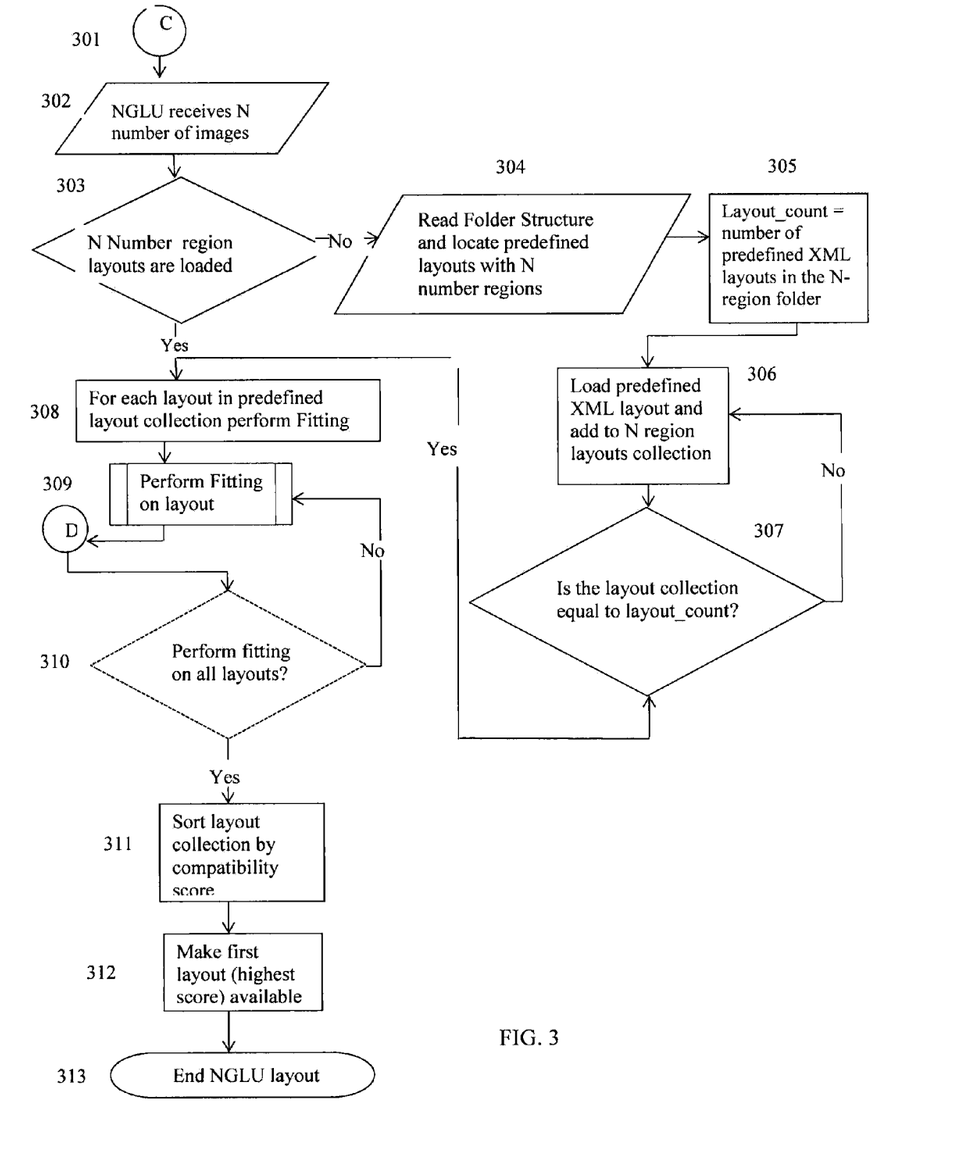
FIG. 3 illustrates an NGLU algorithm.

Referring to FIG. 3, at step 301 NGLU is initiated. Once NGLU receives N number of images at step 302 it first checks to see if N number region layouts exist in its collection at step 303. In the case where DLE was used to create new layouts (FIG. 5) N number region layouts would then exist and are used. In the case where DLE has not been executed then NGLU performs the following task: if N number region layouts don't exist, then at step 304 NGLU reads the database's storage folder structure and locates all predefined layouts. At step 305, NGLU sets the layout_count equal to the number of predefined XML layouts in n_region folder. NGLU then iterates through however many XML predefined layouts exist in all n_region folders in steps 306 and 307. This loads all layouts for a given product size.

Figure 4:
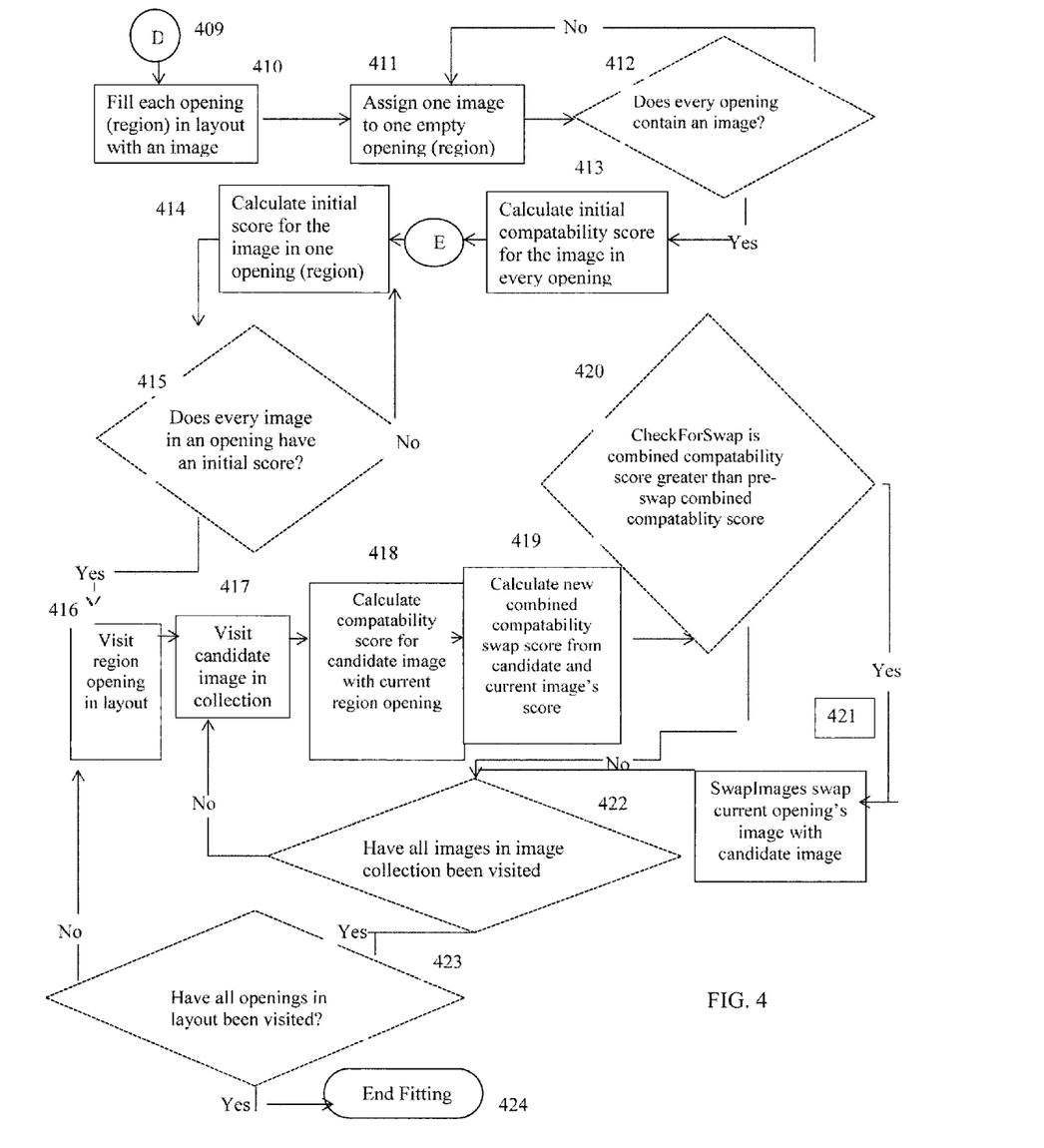
FIG. 4 illustrates another NGLU algorithm.

Calculating a compatibility score for each layout begins at step 308 and proceeds to step 409 of FIG. 4. NGLU performs fitting on all N number layouts using the N number of images by iterating over each layout and populating each layout with N number of images at step 410. For each layout in the collection of layouts NGLU fills each opening/region in the layout with an image by assigning an image to each opening region until all openings contain one image at steps 411 and 412. NGLU then initiates compatibility score calculation on each image in its assigned opening at step 413 which initiates the process shown in FIG. 6 at step 613. The beginning score is initialized to zero at step 614. NGLU computes aspect ratio difference as between an image and its assigned opening at step 615. If the aspect ratio difference is less than 0.78 then an amount of (100 minus the aspect ratio difference) multiplied by 5 is added to the score at steps 616 and 617. Also, an optional calculation includes NGLU computing an image area amount for the image which is then added to the score (not shown in flow chart). After this NGLU takes one of two paths based on whether the image aspect ratio is less than or greater than the region aspect ratio.

Figure 6:
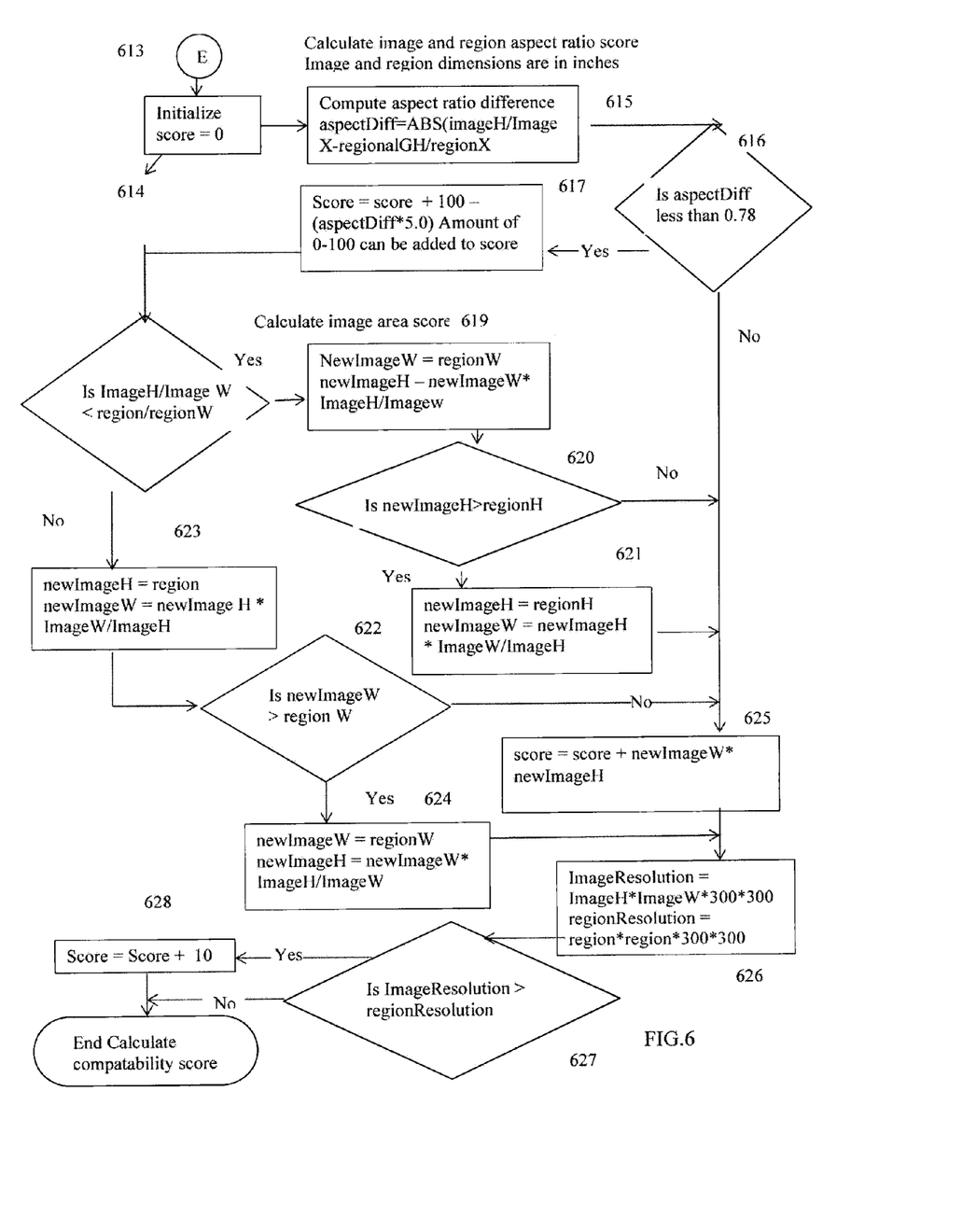
FIG. 6 illustrates a compatibility score algorithm.

Path #1—If image aspect ratio is less than region aspect ratio then a new image width and height get calculated as shown at step 619. NGLU computes a new image width ("newImageW") by assigning it the region's width ("regionW"). NGLU computes a new image height ("newImageH") by assigning it newImageW multiplied by the image's aspect ratio. If newImageH is greater than region height ("regionH") as illustrated at step 620, then NGLU re-computes a newImageH by assigning it the regionH. NGLU also re-computes newImageW by assigning it the newImageH multiplied by the image's inverse aspect ratio, both shown at step 621.

Path #2—If image aspect ratio is greater than region aspect ratio then a new image height and width get calculated differently than path #1. NGLU computes newImageH by assigning it the regionH; and NGLU computes newImageW by assigning it newImageH multiplied by image's inverse aspect ratio, both shown at step 623. If newImageW is greater than regionW at step 622 then NGLU re-computes a newImageW by assigning it the regionW. NGLU also re-computes newImageH by assigning it the newImageW multiplied by the image aspect ratio both shown at step 624.

Once one of the paths has been performed NGLU adds an amount equal to the calculated newImageW and newimageH based area (newImageW multiplied by imageImageH) as part of the layout's compatibility scoring at step 625. NGLU computes a resolution score at step 626 by first calculating the image resolution and the region area resolution. If the image resolution is larger than the region resolution at step 627 then NGLU adds a value of 10 to the compatibility score at step 628.

NGLU then verifies that every image in an opening has had an initial compatibility score calculated at step 415, then NGLU visits each opening in the layout at step 416. For each opening in the layout NGLU iterates through the collection of N number of images using them as possible candidate images to replace existing images currently assigned to openings within the layout beginning at step 417. NGLU determines if a swap should occur as follows. NGLU calculates a compatibility fitting score for the candidate image using the current opening at step 418. NGLU also calculates a compatibility fitting score for the current image and the candidates opening. NGLU adds both scores together for a combined score and compares them to the combined score from the existing candidate and current image's scores at step 419. NGLU checks for a swap condition by comparing the old combined scores with the new possible swap scores at step 420. If new combined potential swap score is larger than the original combined scores, then a swap occurs at step 421, and the candidate is assigned to the current opening and the current opening's image is assigned to the candidate image's opening.

This continues until all of the N number of images have been scored against the current opening and combined scores have been compared and checked at step 422. NGLU continues to iterate over every opening at step 423 until every image has been tried in every opening and potential swap combined scores have been computed and compared with existing combined scores. This ultimately ensures that each image is in the most appropriate opening based on aspect ratio, image area and resolution scoring as illustrated in FIG. 6.

NGLU computes a total score for the layout and this score gets saved and used later for sorting the layouts within the layout collection. Once NGLU has iterated over all the layouts at step 310 and performed fitting on every layout it next sorts the layouts in descending order within the collection at step 311 based each layout's total compatibility score. NGLU provides the first layout, the highest scoring layout, within the sorted collection available to the client application at step 312.

Figure 1B:
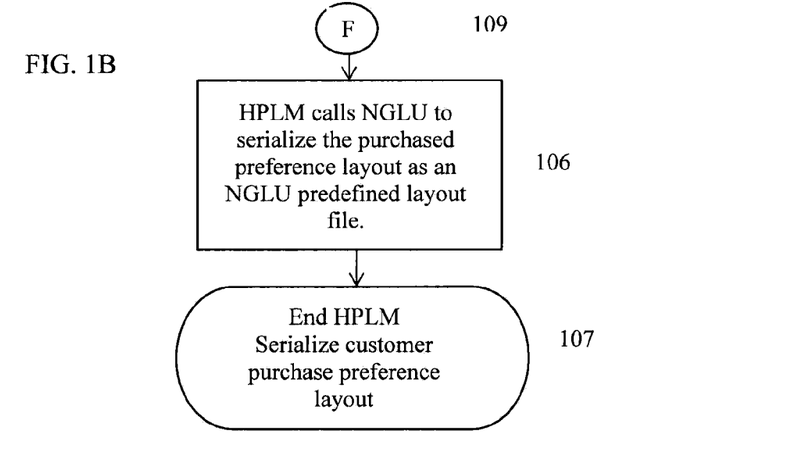

HPLM, upon the customer purchasing the layout based product at step 104, initiates serializing the customer purchased preferred layout at step 105, also shown as step 109 in FIG. IE. HPLM initiates NGLU to serialize the purchased preferred layout as a NGLU predefined layout file at step 106. The file is in an XML format and since it is stored, it can be loaded for later use as an NGLU layout. Future customers can use this layout without HPLM having to invoke the DLE to create new layouts. This process allows the Kiosk to learn from customer what constitutes customer layout preferences.

Figure 7:
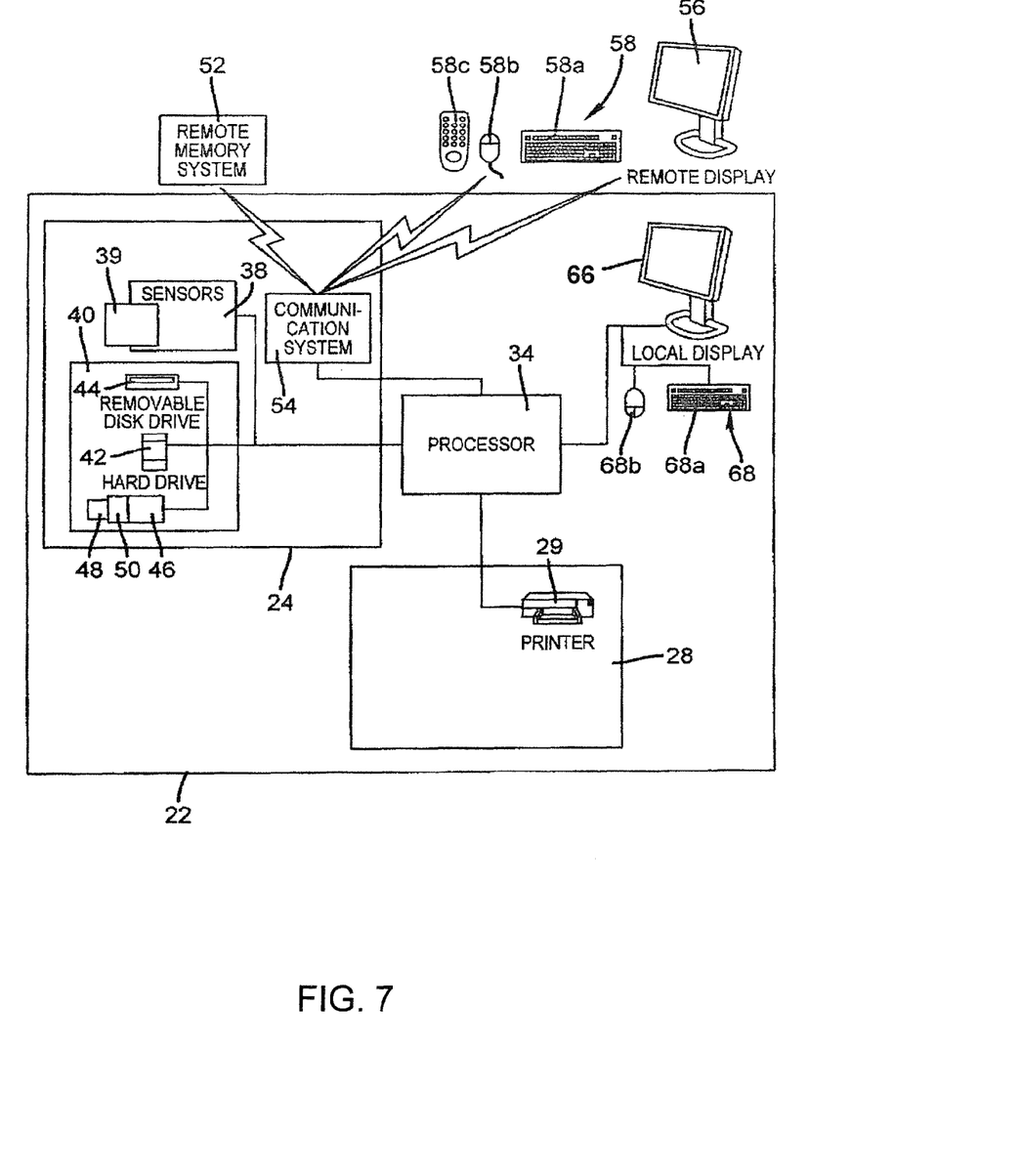
FIGS. 7-8 illustrate example computer systems for implementing embodiments of the present invention.

FIG. 7 illustrates a first embodiment of an electronic system 20 that can be used in generating an image enhanced product. In the embodiment of FIG. 7, electronic system 20 comprises a housing 22 and a source of content data files 24, a user input system, 58, 68, and an output system 26, 56, 66 connected by hardwire or wirelessly to a processor system 34. The source of content data files 24, user input system 58, 68 or output system 26, 56, 66, and processor system 34 can be located within housing 22 or, in other embodiments, circuits and systems of the source of content data files 24, user input system 58, 68 or output system 25, 56, 66, can be located in whole or in part outside of housing 22.

The source of content data files 24 can include any form of electronic or other circuit or system that can supply digital data to processor system 34 from which processor system 34 can derive images for use in forming an image enhanced item. In this regard, the content data files can comprise, for example and without limitation, still images, image sequences, video, graphics, multimedia, and computer generated images. Sources of content data files 24 can optionally capture images, such as digital cameras, to create content data for use in content data files by use of capture devices located at electronic system 20 and/or can obtain content data files that have been prepared and edited by or using other devices. In the embodiment of FIG. 7, source of content data files 24 includes sensors 38, detachable or internal memory and/or storage 40, and a communication system 54.

Sensors 38 are optional and can include light sensors, biometric sensors and other sensors known in the art that can be used to detect conditions in the environment of system 20 and to convert this information into a form that can be used by processor system 34 of system 20. Sensors 38 can also include one or more image/video sensors 39 that are adapted to capture still or video images. Sensors 38 can also include biometric or other sensors for measuring involuntary physical and mental reactions such sensors including, but not limited to, voice inflection, body movement, eye movement, pupil dilation, body temperature, and p4000 wave sensors.

Storage/Memory 40 can include conventional memory devices including solid state, magnetic, optical or other data storage devices. Storage/Memory 40 can be fixed within system 20 or it can be removable. In the embodiment of FIG. 7, system 20 is shown having a hard drive 42, a disk drive 44 for a removable disk such as an optical, magnetic or other disk memory (not shown) and a removable memory slot 46 that that couples to a portable removable memory device 48 such as a removable memory card, USB thumb drive, or other portable memory devices, which mayor may not have a removable memory interface 50 for communicating with removable memory slot 48. Data including, but not limited to, control programs, digital images, programmed applications, metadata, still images, image sequences, video, graphics, multimedia, and computer generated images can also be stored in a remote memory system 52 such as a personal computer, network server, computer network or other digital system. Remote system 52 is shown coupled to processor system 34 wirelessly, however, such systems can also be coupled over a wired network connection.

In the embodiment shown in FIG. 7, system 20 has a communication system 54 that in this embodiment can be used to communicate with an optional remote memory system 52, an optional a remote display 56, and/or optional remote input 58. A remote input station including a remote display 56 and/or remote input controls 58 (also referred to herein as "remote input 58") can communicate with communication system 54 wirelessly as illustrated or can communicate in a wired fashion. In an alternative embodiment, a local input station including either or both a local display 66 and local input controls 68 (also referred to herein as "local user input 68") can be connected to processor system 34 using a wired (illustrated) or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor system 34 with information and instructions from signals received thereby. Typically, communication system 54 will be adapted to communicate with the remote memory system 52, 56, 58 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 58, 68 provides a way for a user of system 20 to provide instructions to processor system 34. This allows such a user to make a designation of content data files to be used in generating an image enhanced output product and to select an output form for the output product. User input system 58, 68 can also be used for a variety of other purposes including, but not limited to, allowing a user to arrange, organize and edit content data files to be incorporated into the image enhanced output product, to provide information about the user or audience, to provide annotation data such as voice and text data, to identify characters in the content data files, and to perform such other interactions with system 20 as will be described later.

In this regard user input system 58, 68 can comprise any form of transducer or other device capable of receiving an input from a user and converting this input into a form that can be used by processor system 34. For example, user input system 58, 68 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 7, remote input system 58 can take a variety of forms, including, but not limited to, a remote keyboard 58*a*, a remote mouse 58*b*, and a remote control 58*c*, and a local input 68 includes a local keyboard 68*a* and a local mouse 68*b*.

Output system 26 is used for rendering images, text or other graphical representations in a manner that allows an image enhanceable item to be converted into an image enhanced product. In this regard, output system 26 can comprise any conventional structure or system that is known for printing or recording images, including, but not limited to, printer 29. Printer 29 can record images on a tangible surface using a variety of known technologies including, but not limited to, conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale or sepia toned images.

In certain embodiments, the source of content data files 24, user input system 58, 68 and output system 26, 56, 66 can share components. Processor system 34 operates system 20 based upon signals from user input system 58, 68, sensors 38, storage/memory 40 and communication system 54. Processor system 34 can include, but is not limited to, a programmable digital computer, a programmable microprocessor, a programmable logic processor, a series of electronic circuits, a series of electronic circuits reduced to the form of an integrated circuit, or a series of discrete components on a printed circuit board.

Figure 8:
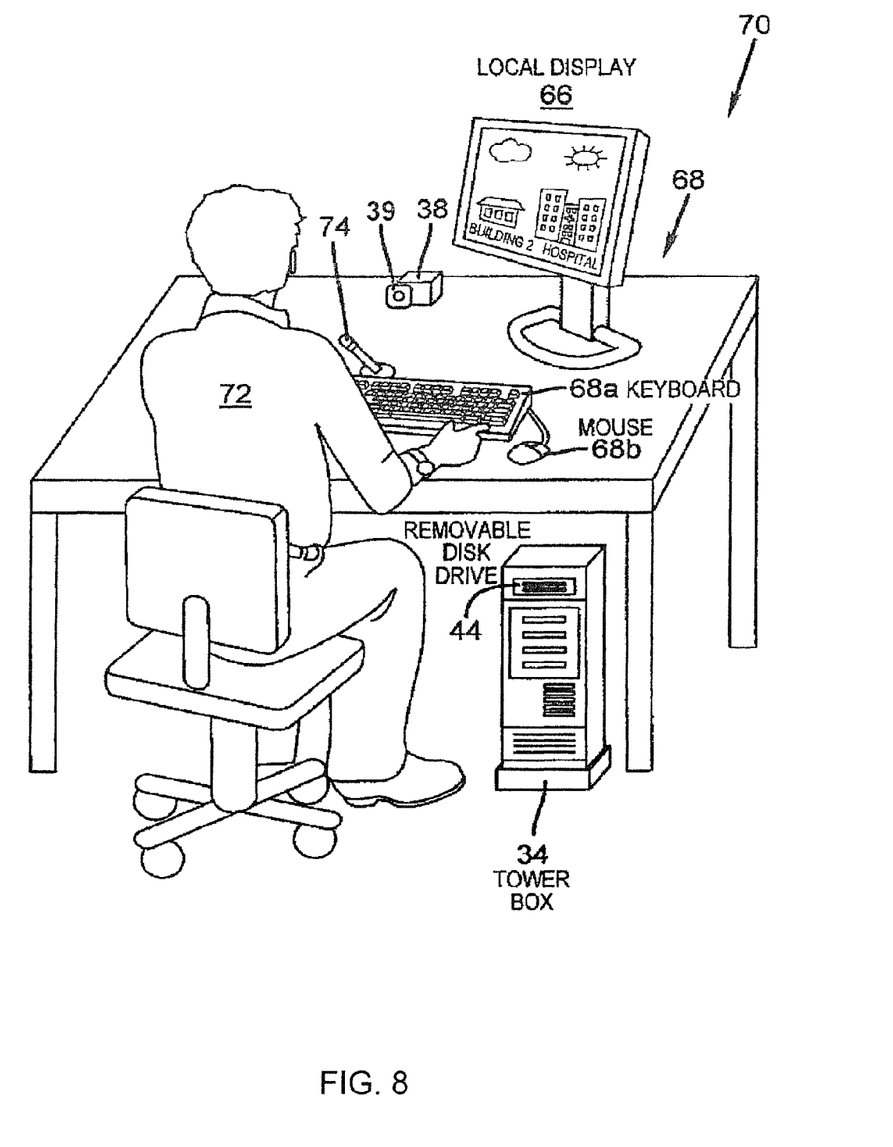

As is illustrated in FIG. 8, local user input 68 can take the form of an editing studio or kiosk 70 (hereafter also referred to as an "editing area 70"). In this illustration, a user 72 is seated before a console comprising local keyboard 68*a* and mouse 68*b* and a local display 66 which is capable, for example, of displaying multimedia content. As is also illustrated in FIG. 8, editing area 70 can also have sensors 38 including, but not limited to, image sensor 39, audio sensors 74 and other sensors such as multispectral sensors that can monitor user 72 during a user or production session.

The vast majority of layouts have elements within the layout that can be grouped in columns or rows. Columns can also be grouped within rows and rows can be grouped in columns and so on. SuperGlu is a method of overcoming the challenge of diverse aspect ratio images existing within the same layout. It's a technique that can be applied to an existing template based layout.

SuperGlu analyzes the template layout and extracts the intent of the layout and massages the layout by scaling the images to fit into the original layout boundaries. Most template layouts can be broken down into groups and subgroups of rows and columns of images. Images within a row for example can be scaled such that they all have the same height which maintains conformity within the row. Images within a column can be scaled such that they all have the same width maintaining conformity within the column. Whole rows can be scaled and columns can be scaled. By scaling elements and sub elements in a layout it is possible to eliminate inconsistent gutter space as well as unnecessary white space.

To understand how the analysis portion of the algorithm works we walk through analyzing a typical layout:

Step 1) Determine the gutter distance (size)

Step 2) Find the rows. Find openings with the same vertical location and same height and are separated by the gutter distance. Put them into a row. Single openings can also be put into single rows.

Step 3) [Optional] Find all the columns. Find openings with the same horizontal locations and same width and are separated by the gutter distance. Put them into the column.

Step 4) Combine rows inside of columns. Rows and openings with the same horizontal location and the same widths can be combined into the same column.

Step 5) Combine columns inside of rows. Columns with the same vertical location and same height can be combined into the same row.

Step 6) determine if all openings have been used in steps 2 through 5.

If not then repeat steps 2 through 5 until:

a) all openings have been combined into rows and columns b) all rows and columns have been combined into columns and rows until there is only one encompassing row or column.

Step 7)—Assign images to openings.

Step 8)—Assign scale factor to each image. The scale factor will be adjusted as the images, rows and columns are scaled.

The resulting data structure is a tree with openings at it's leafs with rows and columns as its branches. After analysis, images are assigned to the openings within the rows and columns. Each image is assigned a scale factor. The scale factor will be adjusted as the images, rows and columns are scaled.

The following steps detail an example process of laying out the images within the rows and columns:

Step 1 scale all images in each row to have the same height by adjusting the images scale factor. Adjust the images horizontal positions to maintain gutter size.

Step 2 scale all rows (images) within each column to have the same width by adjusting the images scale factor. Adjust the row's vertical positions to maintain gutter size.

Step 3 scale all columns within a row to have the same height by adjusting the encompassed images scale factor. Adjust columns horizontal positions to maintain gutter size.

Step 4 if innermost columns and rows have been scaled to have the same heights and widths respectively and we are at the outermost parent row or column, then scale the outermost row or column to fit within the layout boundary.

The exemplary embodiments have been described in detail with particular reference to certain preferred embodiments thereof, but it will be understood that variations and modifications can be effected within the spirit and scope of the invention.

What is claimed is:

1. A computer implemented method of generating a digital collage layout comprising:
retrieving a group of digital images from a computer accessible memory;
determining whether to select the digital collage layout from a stored collection of digital collage layouts or to generate a new set of the digital collage layouts and select the digital collage layout from the new set, wherein the determining includes checking if the stored collection of digital collage layouts includes a collage layout having a same number of regions as there are digital images in the group of digital images; and
providing the digital collage layout from the stored collection or from the new set based on the determining.

2. The method of claim 1, further comprising fitting the group of digital images to a corresponding region for each of the collage layouts having the same number of regions as there are digital images in the group of digital images.

3. The method of claim 2, further comprising calculating a compatibility score for each of the collage layouts having the group of digital images fitted therein.

4. A computer implemented method of generating a digital collage layout comprising:
retrieving a group of digital images from a computer accessible memory;
determining whether to select the digital collage layout from a stored collection of digital collage layouts or to generate a new set of the digital collage layouts and select the digital collage layout from the new set; and
providing the digital collage layout from the stored collection or from the new set based on the determining, wherein the providing includes automatically generating a plurality of unique collage layouts each having a same number of regions as there are digital images in the group of digital images and each having a region for each of the digital images in a same orientation as each of the digital images.

5. The method of claim 4, further comprising adding the plurality of unique collage layouts to the stored collection of digital collage layouts.

6. A computer implemented method of generating a digital collage layout comprising:
retrieving a group of digital images from a computer accessible memory;
determining whether to select the digital collage layout from a stored collection of digital collage layouts or to generate a new set of the digital collage layouts and select the digital collage layout from the new set;
providing the digital collage layout from the stored collection or from the new set based on the determining; and
determining if the customer purchased the provided digital collage layout and serializing the purchased digital collage layout as a predefined layout file.

7. A computer implemented method of generating a digital collage layout comprising:
retrieving a group of digital images from a computer accessible memory;
determining whether to select the digital collage layout from a stored collection of digital collage layouts or to generate a new set of the digital collage layouts and select the digital collage layout from the new set;
providing the digital collage layout from the stored collection or from the new set based on the determining; and
calculating a compatibility score for one digital image corresponding to one region in a digital collage layout.

8. The method of claim 7, further comprising calculating a first combined compatibility score for a pair of digital images each positioned in a corresponding region.

9. The method of claim 8, further comprising calculating a second combined compatibility score for the pair of digital images wherein each is swapped into the other digital image's region.

10. The method of claim 9, wherein the pair of digital images are each positioned according to either the first or second compatibility score based on which compatibility score is higher.

11. A program storage device readable by machine, tangibly embodying a program of instructions executable by the machine to perform operations comprising:
instructions for retrieving a group of digital images from a computer accessible memory;
instructions for determining whether to select the digital collage layout from a stored collection of digital collage layouts or to generate a new set of the digital collage layouts and select the digital collage layout from the new set, wherein the instructions for determining includes instructions for checking if the stored collection of digital collage layouts includes a collage layout having a same number of regions as there are digital images in the group of images; and instructions for providing the digital collage layout from the stored collection or from the new set based on the determining.

* * * * *